US008401696B2

(12) United States Patent
Ozaki et al.

(10) Patent No.: US 8,401,696 B2
(45) Date of Patent: Mar. 19, 2013

(54) BANKNOTE HANDLING APPARATUS AND METHOD OF CONTROLLING BANKNOTE HANDLING APPARATUS

(75) Inventors: Hirofumi Ozaki, Shinagawa-Ku (JP); Osamu Ito, Kawaguchi (JP)

(73) Assignee: Glory Ltd., Himeji-Shi (JP)

( * ) Notice: Subject to any disclaimer, the term of this patent is extended or adjusted under 35 U.S.C. 154(b) by 890 days.

(21) Appl. No.: 12/444,042

(22) PCT Filed: Oct. 6, 2006

(86) PCT No.: PCT/JP2006/320121

§ 371 (c)(1), (2), (4) Date: Apr. 2, 2009

(87) PCT Pub. No.: WO2008/044279

PCT Pub. Date: Apr. 17, 2008

(65) Prior Publication Data

US 2010/0030372 A1 Feb. 4, 2010

(51) Int. Cl.
*G06F 7/00* (2006.01)
*B07C 5/00* (2006.01)

(52) U.S. Cl. ........ 700/224; 700/219; 700/213; 700/222; 700/231; 700/232; 700/228; 209/534

(58) Field of Classification Search ........................ None
See application file for complete search history.

(56) References Cited

U.S. PATENT DOCUMENTS

| | | | |
|---|---|---|---|
| 4,503,407 A | 3/1985 | Ogura | |
| 4,630,813 A | 12/1986 | Watanabe et al. | |
| 4,928,230 A | 5/1990 | Kawamura et al. | |
| 5,182,796 A * | 1/1993 | Shibayama et al. | 715/841 |
| 5,469,241 A | 11/1995 | Takahashi et al. | |
| 6,507,769 B2 | 1/2003 | Urata et al. | |
| 6,540,090 B1 | 4/2003 | Sakai et al. | |
| 6,621,919 B2 * | 9/2003 | Mennie et al. | 382/135 |
| 7,403,721 B2 * | 7/2008 | Yamada | 399/21 |
| 2005/0053183 A1 | 3/2005 | Abe et al. | |

FOREIGN PATENT DOCUMENTS

| | | |
|---|---|---|
| EP | 1 035 520 A1 | 9/2000 |
| EP | 1035520 A1 * | 9/2000 |
| JP | 2000-259890 A1 | 9/2000 |
| JP | 2000-259895 A1 | 9/2000 |
| JP | 2003-178348 A1 | 6/2003 |
| WO | 2006/045247 A1 | 5/2006 |

* cited by examiner

*Primary Examiner* — Gene Crawford
*Assistant Examiner* — Yolanda Jones
(74) *Attorney, Agent, or Firm* — Burr & Brown

(57) ABSTRACT

A banknote handling apparatus and a method of controlling the banknote handling apparatus that make the display of complicated functions and configuration of a banknote handling apparatus easy for the operator to understand. A banknote handling apparatus of the present invention includes an operation unit that accepts an instruction from an operator, first and second display units that can display graphics, a storage unit that stores first and second data for display on the first and second display units, detecting part that detects an occurrence of a predetermined event, and a control unit that reads out first and second data stored in the storage unit based on the content of the event, causes the first display unit to display the first data, and causes the second display unit to display the second data, when the detecting part detects the occurrence of the predetermined event.

18 Claims, 6 Drawing Sheets

BANKNOTE HANDLING APPARATUS AND METHOD OF CONTROLLING BANKNOTE HANDLING APPARATUS

FIELD OF THE INVENTION

The present invention relates to a banknote handling apparatus and a method of controlling the banknote handling apparatus, and particularly, to a banknote handling apparatus that includes a plurality of display units capable of displaying graphics and that displays graphics easy for the operator to understand and a method of controlling the banknote handling apparatus.

BACKGROUND OF THE INVENTION

In recent years, along with the complication of the functions and configurations of banknote handling apparatuses, it is desired to make the display of menu screens and abnormalities (for example, jams) of the banknote handling apparatuses easy for the operator to understand. Consequently, a banknote handling apparatus including a plurality of display units is known.

For example, a banknote handling apparatus disclosed in Japanese Patent Laid-Open No. 2000-259895 (hereinafter referred to as "Patent Document 1") includes a function display unit 208, a whole display unit 209, and first to third individual display units 210 to 212. The function display unit 208 displays the set contents and guidance for setting functions. The whole display unit 209 is constituted by a guidance display unit 216 and a digital display unit 221. When a jam occurs, the guidance display unit 216 lights up an LED 223 corresponding to the jam occurrence location. The digital display unit 221 displays the total value of the amount of money or the number of banknotes in numbers. The first to third individual display units 210 to 212 display the numbers of banknotes or amounts of money stacked on stacking units 69 to 71 corresponding to themselves (see paragraphs 0104 to 0112, FIGS. 10, 14, and 15 of Patent Document 1).

However, the function display unit 208, the whole display unit 209, and the first to third individual display units 210 to 212 of the banknote handling apparatus disclosed in Patent Document 1 only display predetermined information. More specifically, the function display unit 208 displays the set contents and guidance for setting functions, the whole display unit 209 displays the jam occurrence location and the total value of the amount of money, and the first to third individual display units 210 to 212 display the number of banknotes and the like stacked on the stacking units 69 to 71 corresponding to themselves. Therefore, it is difficult to make the display of the complicated functions and configuration easy for the operator to understand in the banknote handling apparatus disclosed in Patent Document 1.

SUMMARY OF THE INVENTION

An object of the present invention is to provide a banknote handling apparatus and a method of controlling the banknote handling apparatus that make the display of complicated functions and configuration of a banknote handling apparatus easy for the operator to understand.

According to a first aspect of the present invention, there is provided a banknote handling apparatus characterized by comprising:

an operation unit that accepts an instruction from an operator;

first and second display units that can display graphics;

a storage unit that stores first and second data for display on the first and second display units;

detecting part that detects an occurrence of a predetermined event; and a control unit that reads out first and second data stored in the storage unit based on the content of the event, causes the first display unit to display the first data, and causes the second display unit to display the second data, when the detecting part detects the predetermined occurrence of the event.

According to a second aspect of the present invention, there is provided a method of controlling a banknote handling apparatus that can execute a counting process of banknotes, the control method characterized by comprising:

detecting an occurrence of a predetermined event;

reading first and second data stored in a storage unit based on the content of the detected event; and displaying the read first data on a first display unit and displaying the read second data on a second display unit.

The present invention can make the display of the complex functions and configuration of a banknote handling apparatus easy for the operator to understand. As a result, the operation efficiency of the operator can be improved, and operational mistakes of the operator can be reduced.

DETAILED DESCRIPTION OF THE INVENTION

An embodiment of the present invention will be described below with reference to the drawings. The content below is an embodiment of the present invention and does not limit the present invention.

Figure 1:
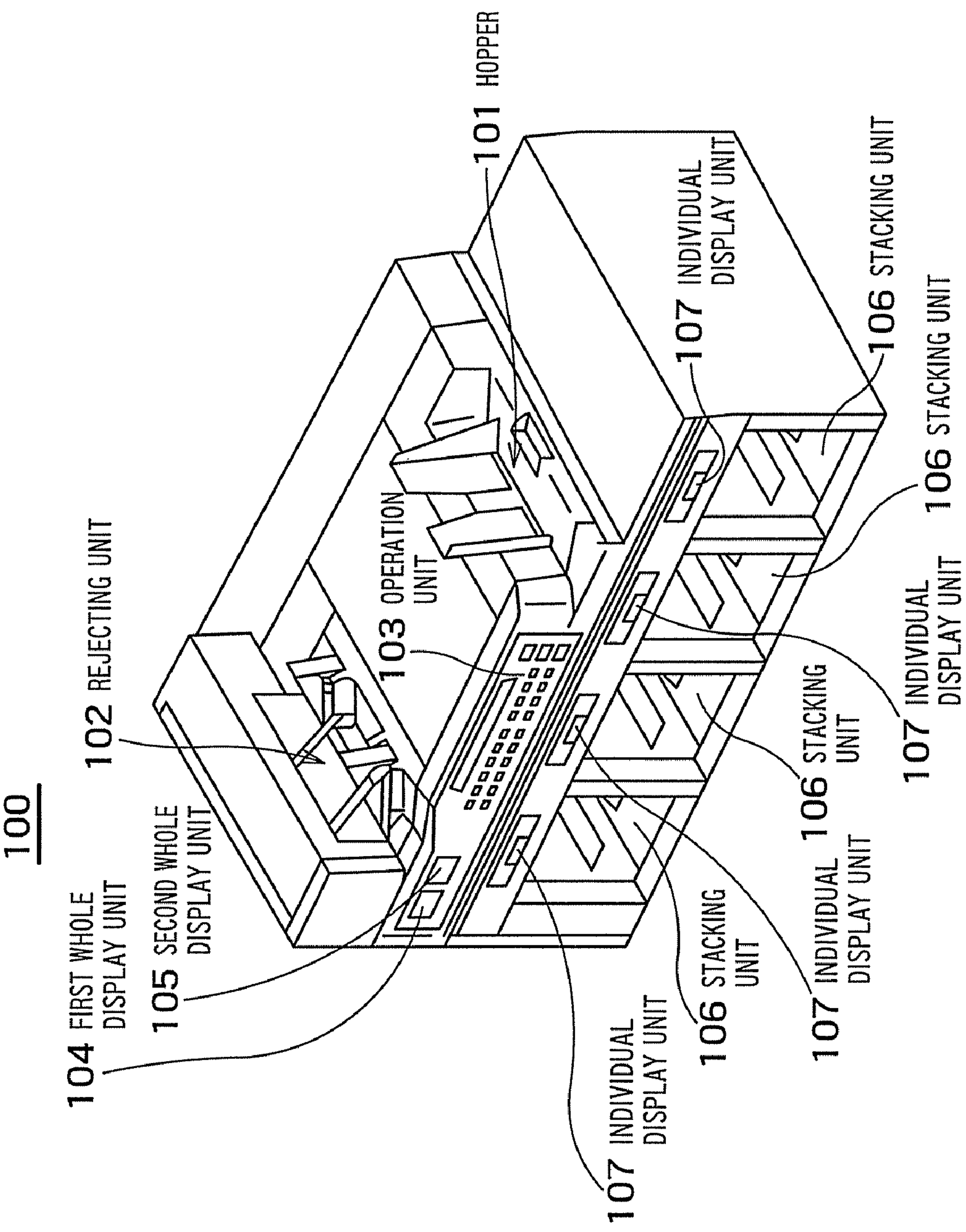
FIG. 1 is a perspective view of an appearance of a banknote handling apparatus 100 according to the embodiment of the present invention.

FIG. 1 is a perspective view of an appearance of a banknote handling apparatus 100 according to the embodiment of the present invention.

The banknote handling apparatus 100 according to the embodiment of the present invention includes a hopper 101, a rejecting unit 102, an operation unit 103, a first whole display unit 104, a second whole display unit 105, four stacking units 106, and four individual display units 107.

The hopper 101 sends banknotes set by the operator into the banknote handling apparatus 100. The rejecting unit 102 dispenses banknotes when the banknotes sent by the hopper 101 are rejected banknotes (for example, "counterfeit notes"). The operation unit 103 includes input keys for accepting an instruction from the operator. The first whole display unit 104 and the second whole display unit 105 display various data described below (for example, graphic data). The stacking unit 106 stacks the banknotes sent from the hopper 101 by denomination and detects the full state. The individual display unit 107 is arranged for each stacking unit 106 and displays the number of banknotes stacked in the corresponding stacking unit 106. Although FIG. 1 illustrates four stacking units 106 and individual display units 107, the numbers of the stacking units 106 and the individual display units 107 are not limited to four.

The first whole display unit 104 and the second whole display unit 105 are, for example, graphic-type liquid crystal displays (LCDs). The individual display units 107 are, for example, character-type one-line LCDs.

Figure 2:
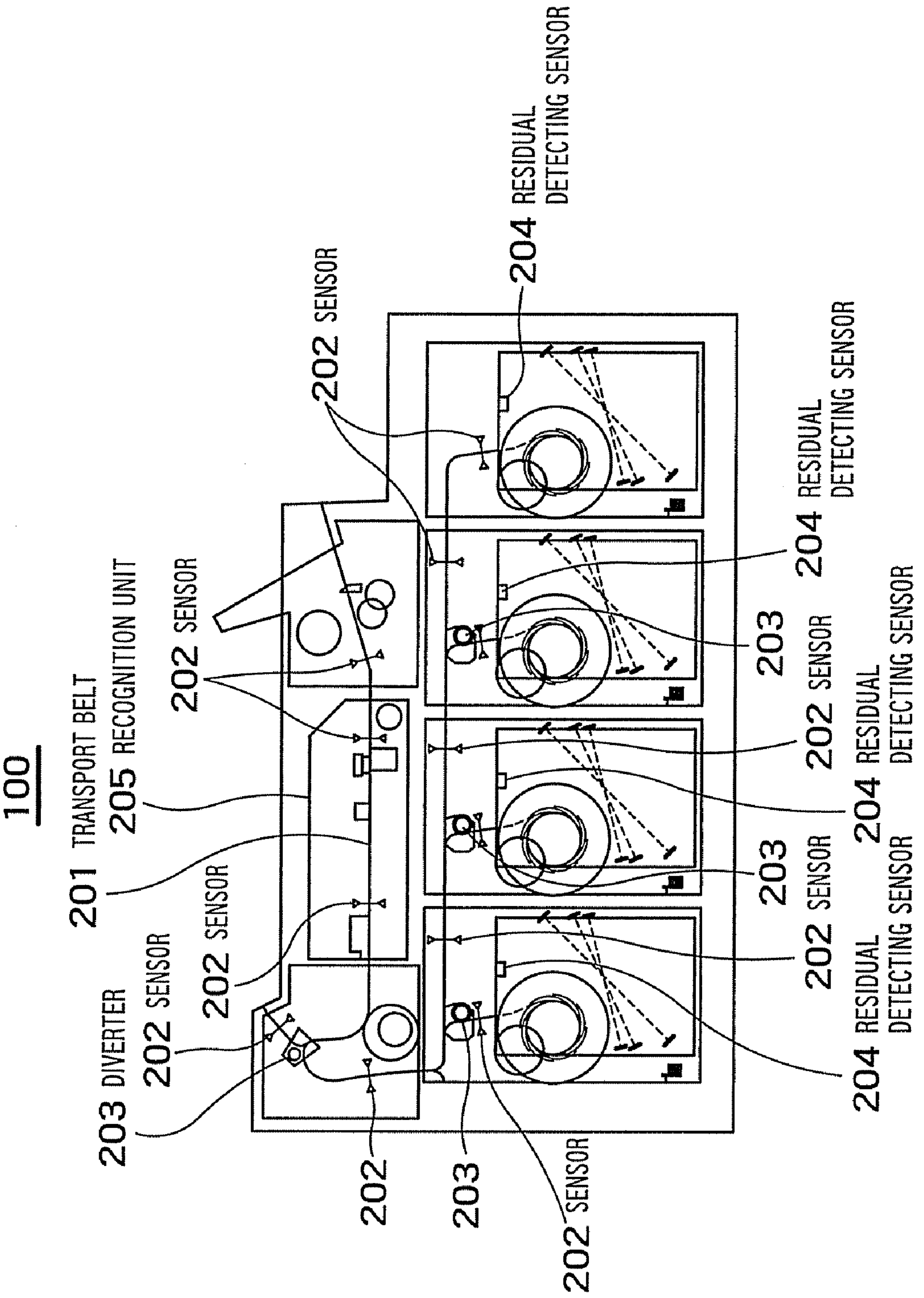
FIG. 2 is a plan view of an internal structure of the banknote handling apparatus 100 according to the embodiment of the present invention.

FIG. 2 is a plan view of an internal structure of the banknote handling apparatus 100 according to the embodiment of the present invention.

The banknote handling apparatus 100 according to the embodiment of the present invention internally includes a transport belt 201, sensors 202, diverters 203, residual detecting sensors 204, and a recognition unit 205.

The transport belt 201 transports the banknotes sent from the hopper 101 to the rejecting unit 102 or the stacking units 106. The sensors 202 are installed at a plurality of locations and detect jams at the locations. The diverters 203 are installed at diverging points of the rejecting unit 102 and the plurality of stacking units 106 and divert the pathway on the transport belt 201. The residual detecting sensor 204 is installed in each stacking unit 106 and detects whether the banknotes remain in the corresponding stacking unit 106. The recognition unit 205 recognizes attributes of the banknotes ("counterfeit note", "fit note/unfit note", "denomination", "new note/old note", and so forth).

Figure 3:
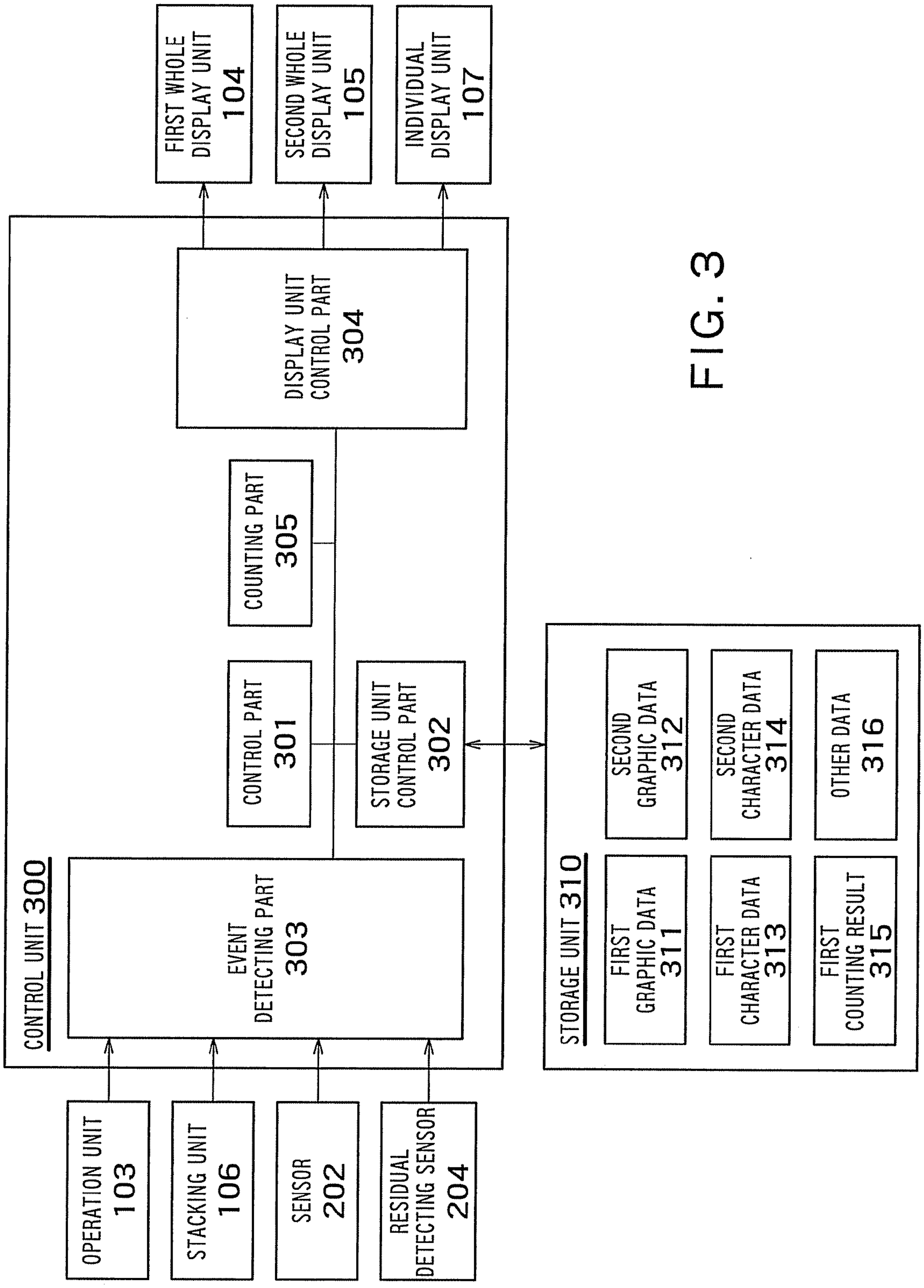
FIG. 3 is a block diagram of a configuration of the banknote handling apparatus 100 according to the embodiment of the present invention.

FIG. 3 is a block diagram of a configuration of the banknote handling apparatus 100 according to the embodiment of the present invention.

The banknote handling apparatus 100 according to the embodiment of the present invention includes a control unit 300 and a storage unit 310. The control unit 300 is, for example, a central processing unit (CPU). The storage unit 310 is, for example, a computer-readable storage medium, such as a hard disk (HDD), or a detachable storage medium, such as a CD-ROM.

The control unit 300 includes, control part 301, storage unit control part 302, event detecting part 303, display unit control part 304, and counting part 305.

The control part 301 controls overall operations (for example, operations of the components shown in FIGS. 1 and 2) of the banknote handling apparatus 100. The storage unit control part 302 reads and writes data to and from the storage unit 310. The event detecting part 303 detects whether an instruction of the operator is accepted from the operation unit 103, whether the stacking units 106 are full state, whether the sensors 202 have detected jams, and whether the residual detecting sensors 204 have detected the existence of remaining banknotes in the stacking units 106. The display unit control part 304 causes the individual display unit 107, the first whole display unit 104, and the second whole display unit 105 to display data stored in the storage unit 310. The counting part 305 counts the banknotes set on the hopper 101 and sent into the banknote handling apparatus 100. The counting process is executed for a plurality of times if an instruction of "verification counting mode" is accepted from the operation unit 103. In that case, the counting process is temporarily halted after the first counting process is finished, and second and subsequent counting processes are executed after the operator sets the banknotes stacked in the stacking units 106 again to the hopper 101.

The storage unit 310 stores in advance graphic data (first graphic data 311 and second graphic data 312) including pictures and character data (first character data 313 and second character data 314) constituted only by characters, and can store a counting result (first counting result 315) of banknotes. The storage unit 310 can further store other data 316 excluding data to be displayed on the first and second full display units 104 and 105. The first graphic data 311, the second graphic data 312, the first character data 313, and the second character data 314 can be added, changed, or removed. The storage unit 310 can store not only the first counting result 315, but also a plurality of counting results.

Figure 5:
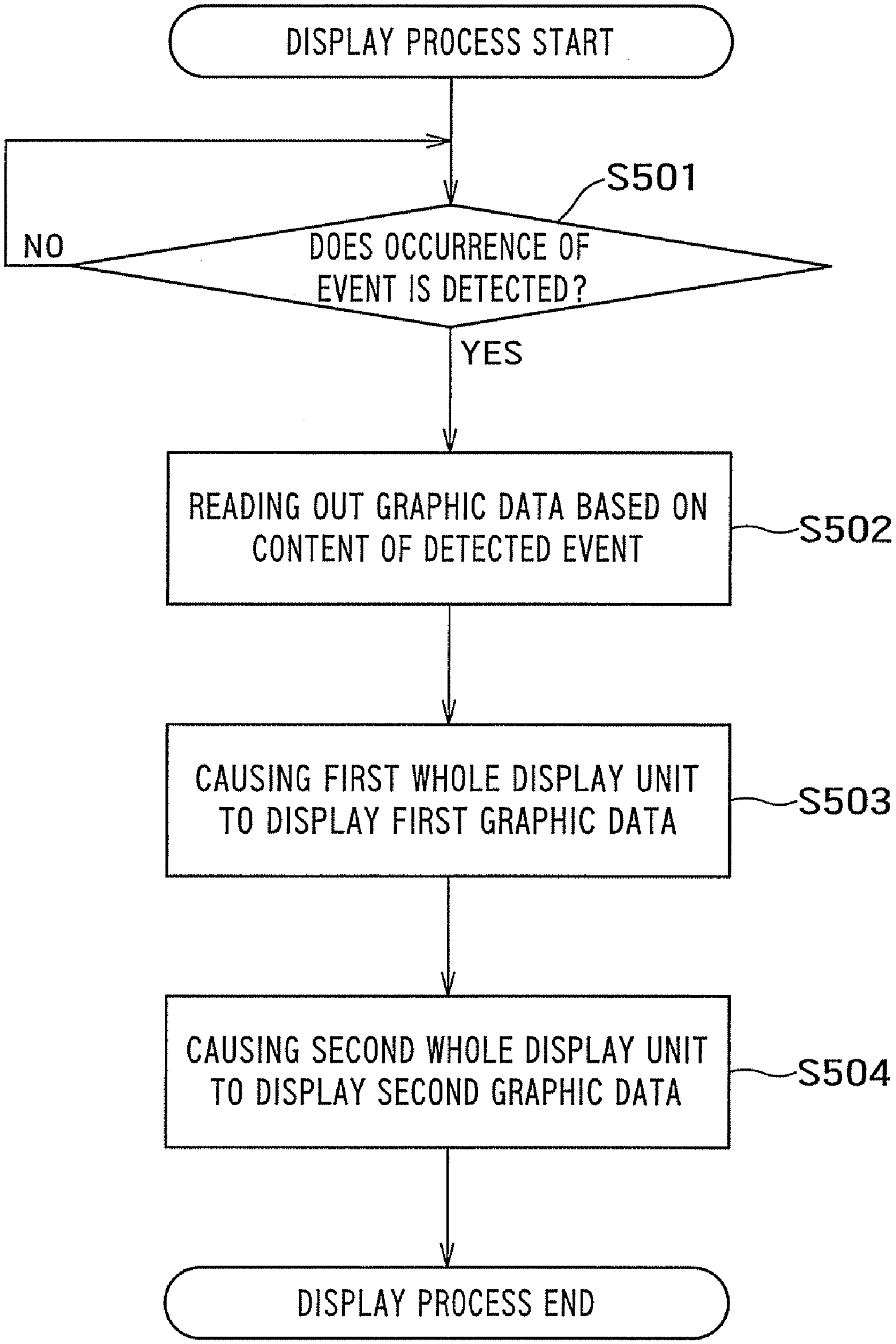
FIG. 5 is a flow chart of an example of a procedure of the control unit 300 in a display process according to the embodiment of the present invention.

FIG. 5 is a flow chart of an example of a procedure of the control unit 300 in a display process according to the embodiment of the present invention.

First, the event detecting part 303 determines whether an occurrence of an event is detected (S501). When the occurrence of the event is detected (S501-Yes), the storage unit control part 302 reads out the data (for example, the first graphic data 311 and the second graphic data 312) stored in the storage unit 310 based on the content of the detected event (S502). Subsequently, the display unit control part 304 causes the first whole display unit 104 to display the first graphic data 311 (S503). Subsequently, the display unit control part 304 causes the second whole display unit 105 to display the second graphic data 312 (S504). Steps S503 and S504 can be in any order and can also be executed simultaneously. In step S504, the graphic data, the counting result, and the character data can be combined and displayed.

Figure 6:
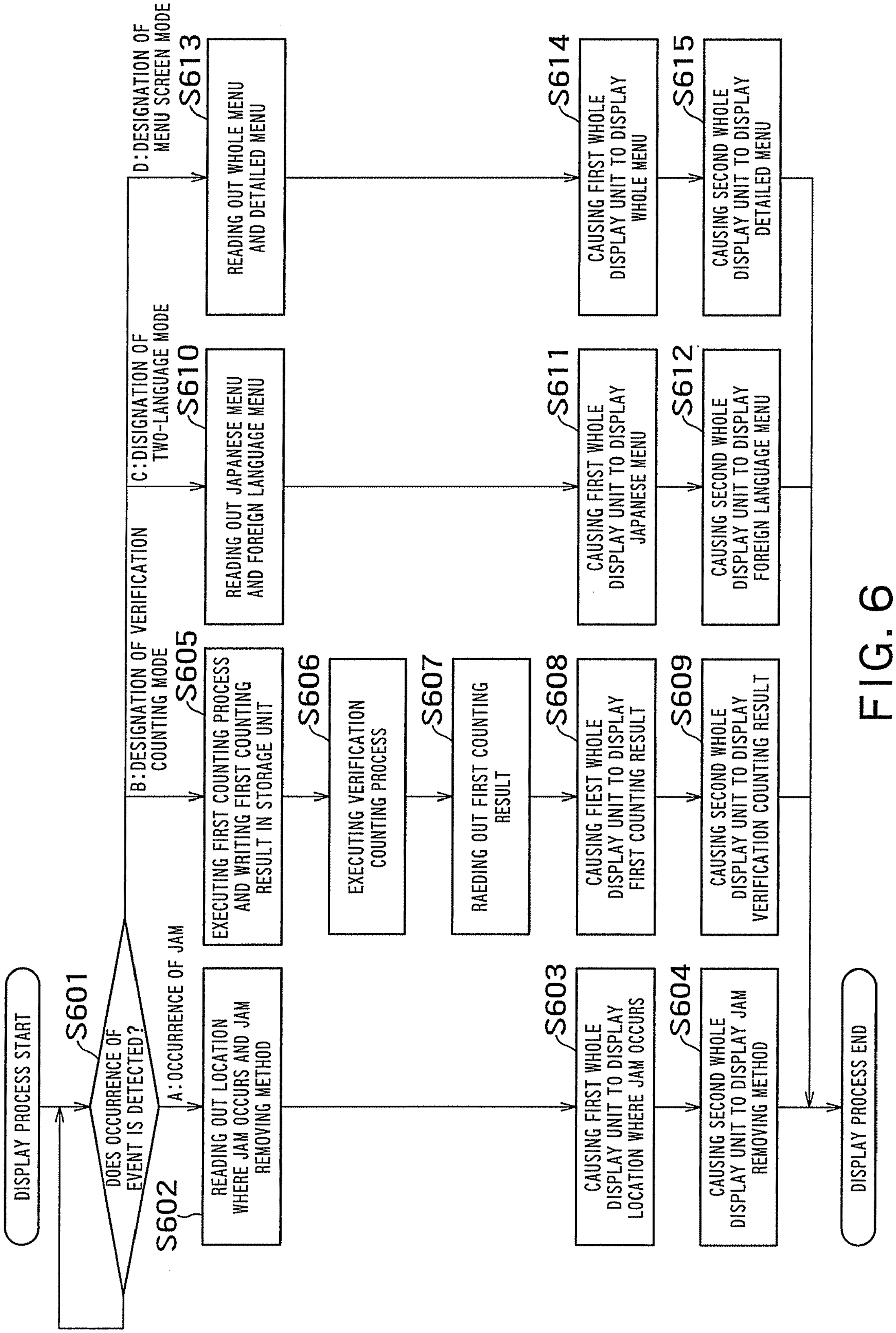
FIG. 6 is a flow chart of a specific example of the procedure shown in FIG. 5.

FIG. 6 is a flow chart of a specific example of the procedure shown in FIG. 5.

First, the event detecting part 303 determines whether the occurrence of the event is detected (S601).

Figure 4:
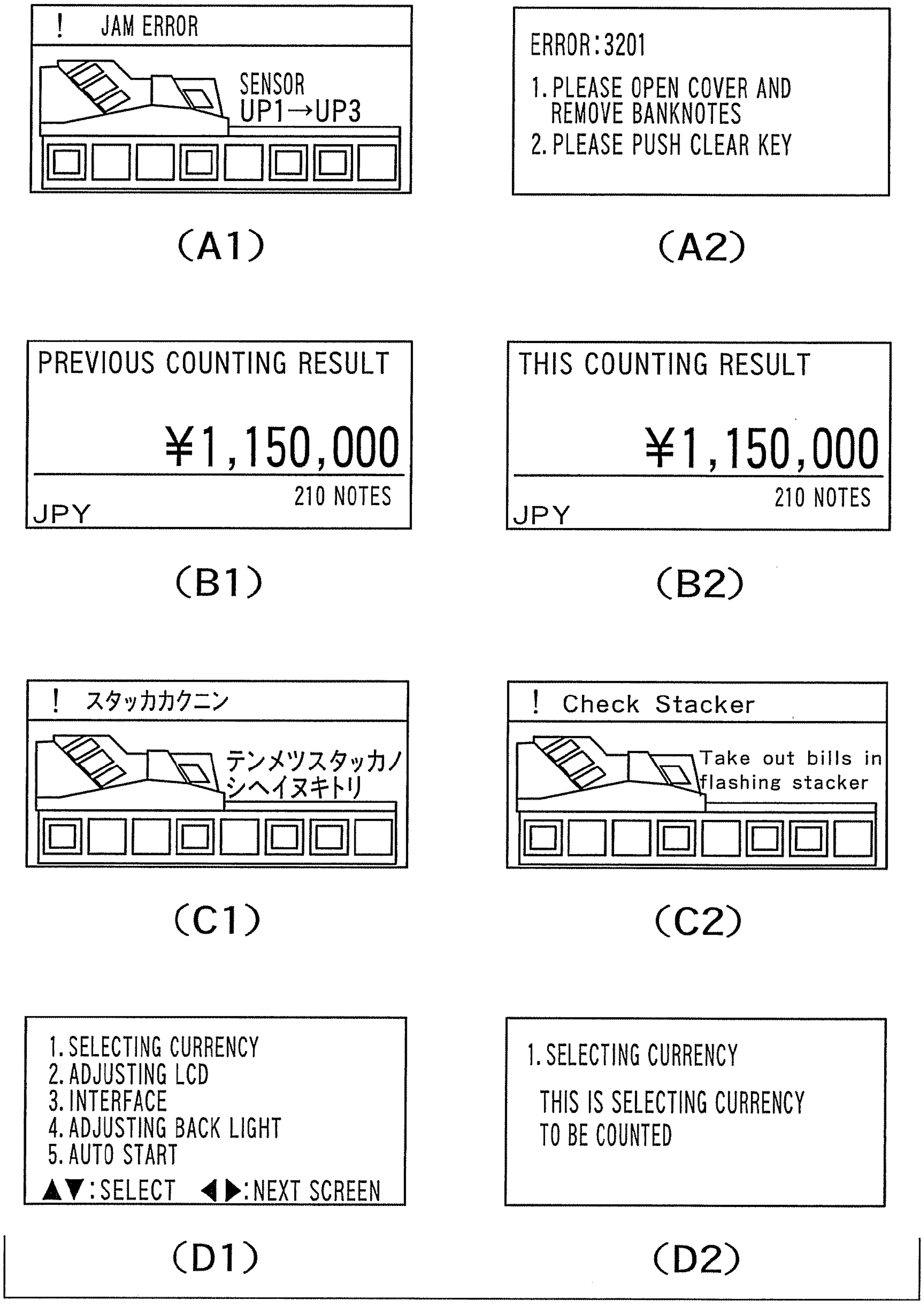
FIG. 4 is block diagrammatic illustrations of examples of the screens displayed on the first whole display unit 104 and the second whole display unit 105 according to the embodiment of the present invention.

If the detected event is "occurrence of jam" (S601-A), the storage unit control part 302 reads out the graphic data (first graphic data 311) indicating a location where the jam occurs and the character data (second character data 314) indicating a jam removing method from the storage unit 310 based on the type of the detected jam (S602). Subsequently, the display unit control part 304 causes the first whole display unit 104 to display the graphic data indicating the location where the jam occurs (S603). Subsequently, the display unit control part 304 causes the second whole display unit 105 to display the character data indicating the jam removing method (S604). As a result, the first whole display unit 104 displays a screen shown in FIG. 4(A1), and the second whole display unit 105 displays a screen shown in FIG. 4(A2). Steps S603 and S604 can be in any order and can be executed simultaneously. Either one of the data indicating the location where the jam occurs and the data indicating the jam removing method can be graphic data, or both of the data can be graphic data or character data. In S601, the display process is executed in the same procedure when the remaining banknotes or the full state of the stacking unit 106 is detected.

Meanwhile, if the detected event is "designation of verification counting mode" (S601-B), the counting part 305 executes the first counting process, and the storage unit control part 302 writes the first counting result 315 in the storage unit 310 (S605). Subsequently, the counting part 305 executes the verification counting process (S606). Subsequently, the storage unit control part 302 reads out the first counting result 315 from the storage unit 310 (S607). Subsequently, the display unit control part 304 causes the first whole display unit 104 to display the first counting result 315 (S608). Subsequently, the display unit control part 304 causes the second whole display unit 105 to display the verification counting result 314 (S609). As a result, the first whole display unit 104 displays a screen shown in FIG. 4(B1), and the second whole display unit 105 displays a screen shown in FIG. 4(B2). Steps S608 and S609 can be in any order and can be executed simultaneously. The number of times of the counting process can be three or more, and in that case, the counting results subsequent to the second counting process are also stored in the storage unit 310.

Meanwhile, if the detected event is "designation of two-language mode" (S601-C), the storage unit control part 302 reads out the graphic data from the storage unit 310 based on the designated language. For example, in the case of "designation of Japanese+English mode", the storage unit control part 302 reads out a Japanese menu and an English menu from the storage unit 310 (S610). Subsequently, the display unit control part 304 causes the first whole display unit 104 to display the Japanese menu (S611). Subsequently, the display unit control part 304 causes the second whole display unit 105 to display the English menu (S612). As a result, the first whole display unit 104 displays a screen shown in FIG. 4(C1), and the second whole display unit 105 displays a screen shown in FIG. 4(C2). Steps S611 and S612 can be in any order and can be executed simultaneously. Either one of the data showing the Japanese menu and the data showing the English menu can be graphic data, or both of the data can be graphic data or character data.

Meanwhile, if the detected event is "designation of menu screen mode" (S601-D), the storage unit control part 302 reads out a whole menu and a detailed menu from the storage unit 310 (S613). Subsequently, the display unit control part 304 causes the first whole display unit 104 to display the whole menu (S614). Subsequently, the display unit control part 304 causes the second whole display unit 105 to display the detailed menu (S615). As a result, the first whole display unit 104 displays a screen shown in FIG. 4(D1), and the second whole display unit 105 displays a screen shown in FIG. 4(D2). Steps S614 and S615 can be in any order and can be executed simultaneously. Either one of the data showing the whole menu and the data showing the detailed menu can be graphic data, or both of the data can be graphic data or character data.

According to the present embodiment, the first whole display unit 104 and the second whole display unit 105 display different data in accordance with the event occurred, thereby making the display of information related to the event occurred easy to understand for the operator. Specifically, since graphic data indicating the location where the jam occurs and the jam removing method are displayed when the jam occurs, the operator can easily remove the jam. Since the first counting result and the verification counting result are displayed when the "verification counting mode" is designated, the operator can easily compare the two counting results. Since the menu screens expressed in two languages are displayed when the "two-language mode" is designated, the usability is not lost under the use environments of the operators with different native languages. Since the whole menu and the detailed menu are displayed when the "menu screen mode" is designated, the operator can easily select a desired function item.

The screens displayed on the first whole display unit 104 and the second whole display unit 105 are switched according to the event occurred. Therefore, the display units do not have to be installed for each event to be occurred, and the configuration of the banknote handling apparatus can be simplified. The graphic data and the character data stored in the storage unit 310 are added, changed, or removed. Therefore, handling is possible without increasing the display units even if the functions or the configuration of the banknote handling apparatus 100 are changed.

The invention claimed is:

1. A banknote handling apparatus comprising:

an operation unit that accepts an instruction from an operator;

first and second display units which are physically isolated and arranged in parallel;

a detecting part that detects an occurrence of a predetermined event;

a storage unit that stores first and second data, which are related to the event and are different data from each other, for display on the first and second display units; and a control unit that reads out first and second data stored in the storage unit based on the content of the event, causes the first display unit to display the first data, which is related to the event, and causes the second display unit to display the second data, which is related to the event and is different from the first data, when the detecting part detects the occurrence of the predetermined event.

2. The banknote handling apparatus according to claim 1, further comprising:

a stacking unit that stacks banknotes; and a sensing unit that detects at least one of a full state of the stacking unit, an existence of remaining banknotes in the stacking unit, and a jam occurred in the device, wherein the detecting part detects the occurrence of the event when the sensing unit detects the full state, the existence of remaining banknotes, or the jam, and the control unit reads out the first and second data stored in the storage unit based on the content of the event detected by the sensing unit.

3. The banknote handling apparatus according to claim 2, wherein the sensing unit detects the jam that occurred in the device, first data is data indicating the content of the jam, and the second data is data indicating a jam removing method.

4. The banknote handling apparatus according to claim 1, wherein the control unit reads out the first and second data stored in the storage unit based on the content of the instruction accepted by the operation unit.

5. The banknote handling apparatus according to claim 4, wherein the storage unit can store at least one counting result, the detecting part detects the occurrence of the event when the operation unit accepts an instruction of a verification counting mode, and the control unit executes first counting, stores the result of the first counting in the storage unit, executes verification counting, causes the first display unit to display the result of the first counting stored in the storage unit, and causes the second display unit to display the result of the verification counting.

6. The banknote handling apparatus according to claim 4, wherein the first and second data stored in the storage unit are menu data of first and second languages expressed by the first and second languages, respectively, the detecting part detects the occurrence of the event when the operation unit accepts an instruction of a two-language mode, and the control unit reads out the menu data of the first and second languages stored in the storage unit.

7. The banknote handling apparatus according to claim 4, wherein the first and second data stored in the storage unit are first menu data and second menu data indicating a subordinate item of the first menu data, respectively, the detecting part detects the occurrence of the event when the operation unit accepts an instruction of a menu screen mode, and the control unit reads out the first and second menu data stored in the storage unit.

8. The banknote handling apparatus according to claim 1, wherein the control unit adds, changes, or removes the first and second data stored in the storage unit.

9. The banknote handling apparatus according to claim 1, wherein the first and second display units are graphic LCDs (Liquid Crystal Displays).

10. The banknote handling apparatus according to claim 1, wherein at least one of the first and second data is graphic data.

11. A method of controlling a banknote handling apparatus that can execute a counting process of banknotes, the control method comprising:

detecting an occurrence of a predetermined event;

reading first and second data, which are related to the event and are different data from each other, stored in a storage unit based on the content of the detected event; and displaying the read first data, which is related to the event, on a first display unit and displaying the read second data, which is related to the event and is different from the first data, on a second display unit, wherein the first and second display units are physically isolated and arranged in parallel.

12. The method of controlling a banknote handling apparatus according to claim 11, wherein the detecting is to detect the occurrence of the event when at least one of a full state of a stacking unit, an existence of remaining banknotes in the stacking unit, and a jam occurs in the apparatus, and the reading is to read the first and second data based on the content of the detected event.

13. The method of controlling a banknote handling apparatus according to claim 12, wherein the detecting is to detect the occurrence of the event when the jam occurs in the apparatus, the first data is data indicating the content of the jam, and the second data is data indicating a jam removing method.

14. The method of controlling a banknote handling apparatus according to claim 11, further comprising controlling a storage unit to add, change, or remove the first and second data.

15. The method of controlling a banknote handling apparatus according to claim 11, further comprising:

accepting an instruction from an operator, wherein the detecting is to detect the occurrence of the event when the accepting accepts the instruction, and the reading is to read the first and second data stored in the storage unit based on the content of the accepted instruction.

16. The method of controlling a banknote handling apparatus according to claim 15, wherein the accepting is to accept an instruction of a verification counting mode, and the control method comprises executing of verification counting process for executing a first counting process, storing the first counting result in the storage unit, and executing a verification counting process, and wherein the reading is to read the first counting result stored in the storage unit, and the displaying is to cause the first display unit to display the first counting result read in the reading and causes the second display unit to display the verification counting result processed in the executing of verification counting process.

17. The method of controlling a banknote handling apparatus according to claim 15, wherein the first and second data are menu data of first and second languages expressed by the first and second languages, respectively, the accepting is to accept an instruction of a two-language mode, and the reading is to read the menu data of the first and second languages.

18. The method of controlling a banknote handling apparatus according to claim 15, wherein the first and second data are first menu data and second menu data indicating a subordinate item of the first menu data, respectively, the accepting is to accept an instruction of a menu screen mode, and the reading is to read the first and second menu data.

* * * * *